(12) United States Patent
Schmidt-Traub et al.

(10) Patent No.: US 6,511,643 B1
(45) Date of Patent: Jan. 28, 2003

(54) METHOD FOR RECOVERING AND/OR REMOVING ORGANIC COMPOUNDS FROM GAS STREAMS

(75) Inventors: Henner Schmidt-Traub, Essen (DE); Dieter Bathen, Bochum (DE); Thomas Schulz, Bad Pyrmanc (DE); Michael Hoffmeister, Laatzen (DE)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/623,637
(22) PCT Filed: Feb. 4, 1999
(86) PCT No.: PCT/EP99/00733
§ 371 (c)(1), (2), (4) Date: Oct. 23, 2000
(87) PCT Pub. No.: WO99/46030
PCT Pub. Date: Sep. 16, 1999

(30) Foreign Application Priority Data

Mar. 9, 1998 (DE) .......................................... 198 10 028

(51) Int. Cl.$^7$ ................................................ B01J 8/00
(52) U.S. Cl. .................................................... 423/245.1
(58) Field of Search ..................................... 423/245.1

(56) References Cited

U.S. PATENT DOCUMENTS 5,421,860 A * 6/1995 Bretz et al. .................... 95/115
5,447,701 A * 9/1995 Inoue et al. ................. 473/224
6,022,399 A * 2/2000 Ertl et al. ...................... 95/114

* cited by examiner

Primary Examiner—Stanley S. Silverman
Assistant Examiner—Marikel Medina

(57) ABSTRACT

The present invention relates to a method for recovering and/or removing organic compounds from gas flows, wherein the method comprises the step of:
  removing the organic compounds from the gas flow using an adsorber and
  desorbing the organic compounds using microwaves, characterized in that the adsorber is a finely dispersed mixture of a hydrophilic and a hydrophobic adsorbent.

5 Claims, 2 Drawing Sheets

METHOD FOR RECOVERING AND/OR REMOVING ORGANIC COMPOUNDS FROM GAS STREAMS

Figure 1:
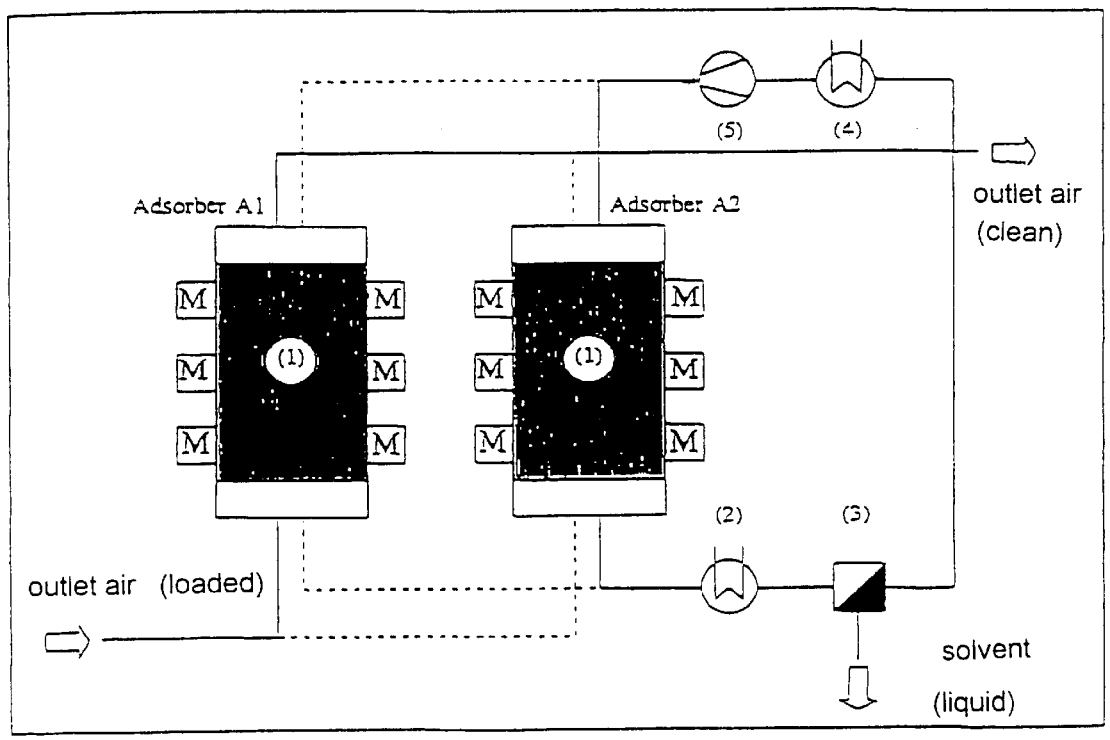

The present invention relates to a method for recovering and/or removing organic compounds from gas flows.

Adsorption processes can be used for the purification of gas flows. One important application of adsorption processes is the removing of volatile organic compounds such as solvents. In view of the changing priorities regarding the ecological sizing of processes it is necessary to model these adsorption processes such that a proportion as high as possible of the volatile compounds can be adsorbed and subsequently be recovered by desorption.

The currently used sorption methods usually comprise three steps: In a first step outlet air is passed through an adsorber wherein the valuable compounds contained in the outlet air are retained. Subsequently the adsorber will be fed with super heated water steam so that mixture comprising water steam and the organic compound can be fed to a second step, a condenser. The therein condensed mixture will be separated in the third step, for example an extraction or a destillation, into desorption agent and organic compound. Before the adsorber can be reused it has to be dried by rinsing with hot inert gas followed by cooling. If polar compounds are adsorbed the third step usually is extremely cost intensive. Therefore, for this case, a temperature change desorption is usually used. Therein the required energy is not supplied via water steam but using a hot rinsing gas, for example nitrogen. Thereby the separation using rectification and the drying of the adsorber bed can be omitted, however the low heat capacity of the rinsing gas makes it necessary to use large amount of rinsing gas at high temperatures.

New methods for charging energy into an adsorber focus on the use of microwaves. Throughout the process engineering application charged electromagnetic energy is used for example for initiating and maintaining chemical reactions or for expelling an unwanted component from solids. Particularly in the fields of drying of foods and ceramic materials the charging of energy using microwaves is employed industrially.

Relating to the field of desorption through microwave energy two methods have been published so far. U.S. Pat. No. 5,282,886 discloses a method wherein the adsorber is radiated with microwaves during adsorption in order to increase the selectivity of the adsorption. DE-A-2857134 describes a method for the regeneration of loaded adsorbing materials through dielectric heating. As examples the isolation of oxygen from air, the removing from $SO_2$ and $H_2S$ from natural gas and the removing of $SO_2$ from exhaust gases are described.

The source of microwave can be installed differently. Microwave ovens can be provided on the outside of the adsorber bed, as described in CA-A-2082690. They can also be provided on top of the adsorber bed. The microwaves will then be guided into a hollow rod in the middle of the adsorbent bed, the microwaves can subsequently be reflected there, as described in DE-B-19526628.

These methods use the conventional known adsorbents like activated charcoal, zinc oxide, activated alumina and molecular sieves.

Microwaves can be used for charging of energy for desorbing adsorbed compounds, since microwaves transfer heat directly at the materials interacting with the microwaves. Heating with microwaves effects a high frequency vibration of the interacting substances, through the combined effect of electric and magnetic fields connected with adsorbed electromagnetic energy. The rapid and direct temperature raise is effected by this molecular friction. However, only molecules having a polar structure can be heated directly with microwaves. Therefore one differentiation between microwave active molecules, i.e. molecules interacting with microwaves and microwave transparent molecules i.e. molecules that do not interact with microwaves.

The use of conventional adsorbing materials in connection with desorption methods using microwaves includes several severe drawbacks.

The use of activated charcoal for example includes several drawbacks. Activated charcoal is such an efficient adsorbent that is normally impossible to desorb the adsorbed substances without distruction through the charging with microwaves. Furthermore the risks of the initiation of fires through the generation of the so-called hot spots has to be considered.

Other conventional adsorbents have the drawback that they are either microwave transparent, i.e. it is not possible to separate the adsorbed substances through microwaves from the adsorbents, or they only adsorb certain kinds of organic substances. For example dealuminated zeolite is microwave transparent. Simultaneously this adsorption material is only employable for unpolar organic substances. Since unpolar substances as well are microwave transparent it is impossible to separate them from the adsorber through charging with microwaves. Alumina, although microwave active, is only employable for polar substances.

In view of the drawbacks of the prior art it is therefore the object of the present invention to provide a method for recovering organic substances which makes it possible to adsorb polar as well as unpolar organic substances, wherein no risk of initiation of fires occurs and wherein the adsorbed organic substances can be separated from the adsorption material through the charging with microwaves.

This object is solved by providing a method for recovering and/or removing organic compounds from gas flows, comprising the steps:

Removing the organic compounds from the gas flow using an adsorbent, and

Desorbing the organic compounds from the adsorbent using microwaves, characterized in that the adsorbent is a finely dispersed mixture of hydrophilic and hydrophobic adsorbents.

The desorbed organic compounds can either be condensed and be recovered or they can be guided into a catalytic or thermic after burning. The desorbing of the organic compounds can be carried out using a rinsing gas. Preferably a rinsing gas having room temperature is used.

The adsorbent used in the method according to the present invention is a finely dispersed mixture of at least one hydrophilic and at least one hydrophobic adsorbent. Preferably the adsorbent is a body of a matrix comprising microdisperse divided inclusions. These inclusions should have a size of from 40 to 15,000 nm, preferably of from 50 to 10,000 nm and particularly preferably of from 100 to 5,000 nm. This mixture secures that the method according to the present invention can adsorb polar as well as unpolar compounds. Furthermore this specific adsorbent prevents the generation of the so-called hot spots and therefore prevents the initiation of fires. The adsorbent used in accordance with the present invention will not be destroyed by the charged microwaves. Further the adsorbed compounds can be recovered without destructing them. The ratio of the above-mentioned mixture, concerning the components of the adsorbent, is not limited.

The preparation of these adsorbents will be illustrated by the following examples.

If an aluminate and a silicate-solution, one of which comprising activated carbon, are mixed together and if this mixture is introduced immediately into a precipitating oil, beaded bodies made from amorphous aluminosilicate comprising inclusions of activated carbon can be obtained. It is furthermore possible to mix a solution comprising aluminium sulphate and a solution of silicate, wherein again one of which comprises activated carbon, and to guide the resulting mixture into a precipitating oil. Again a matrix made from alumino silicate having inclusions of activated carbon can be obtained. An adsorbent based on amorphous $SiO_2$ can be obtained by mixing activated carbon into a solution comprising silicate and subsequent initiation of precipitation by the addition of an acid.

In a preferred method an adsorbent composed of a hydrophilic matrix, therein included hydrophobic material, is used. For example the matrix can be made from aluminosilicate or silica gel with inclusions of activated carbon or dealuminated zeolite. Important is the finely dispersed division of the hydrophobic material. These adsorbents comprise for example particulate activated carbon in an oxidic support based on $SiO_2$, $Al_2O_3$, aluminum phosphate or alumino silicate.

It is furthermore possible to include other hydrophobic materials.

A particularly preferred adsorbent can be prepared according to the so-called sol-gel-process. This process is described in EP-A-570847.

The adsorbents described in EP-A-570847 comprise 5 to 40 wt % particulate activated carbon having a particle size of from 50 to 10,000 nm in an oxidic support, based on amorphous $SiO_2$, $Al_2O_3$ or alumino silicate, whereby the support is formed in a precipitating oil.

The term activated carbon, as used herein, comprises carbon black, graphite and coke.

However, other finely dispersed mixtures made from hydrophilic and hydrophobic adsorbents can be used as well. The hydrophilic matrix can be for example also be composed of a molecular sieve.

Therein included can be a hydrophobic material, such as an dealuminated zeolite. The specific combination of the various materials can lead, in addition to the good removing capacity and desorption characteristics, to separation.

A microwave transparent matrix made from dealuminated zeolite for example can remove unpolar compounds, which itself are microwave transparent, from gas flows. If this matrix furthermore comprises microdisperse divided inclusions made from a material that is microwave active and that may adsorb polar substances (for example amorphous $SiO_2$) this mixture can, after the simultaneous removing of polar and unpolar compounds, lead to a separation.

If such a loaded adsorber is charged with microwaves, the microwave active, polar substances are removed from the microwave active inclusions. Only subsequently the general warming of the matrix, starting from the inclusions, leads to the desorption of the microwave transparent substances from the microwave transparent matrix. Such separations, wherein the adsorption is carried out simultaneously and the desorption occurs selectively, have not been possible prior to the present invention.

The method in accordance with the present invention will be illustrated further with reference to the following example. FIG. 1 shows two parallel adsorption columns provided with a rinsing gas circuit.

While adsorption column (A1) is being loaded, the other adsorption column (A2) is regenerated. The respective change of loading and regeneration can provide a continuous treatment of outlet air comprising solvents. The outlet air comprising solvents is guided into the adsorption column (A1). Therein the solvent is adsorbed by the adsorbent. The purified outlet air leaves the adsorption column (A1) via the head. The adsorbent contained in adsorption column (A2) which is being desorbed, is charged with microwaves by the microwave generators (M). Thereby the adsorbed solvent is desorbed. Simultaneously a slow feed of a rinsing gas is fed into the head of the adsorption column (A2) so that the desorbed solvent is removed. This mixture comprising rinsing gas and solvent is cooled in the condenser (2) until the solvent condenses. The liquid solvent is separated in the separator (3) and can be reused. The rinsing gas is reheated to room temperature using the gas heater (4) and is subsequently refed into the adsorption column (A2) via a compressor (5). This ensures the realisation of a rinsing gas circuit.

When the adsorption column (A1) is completely loaded the adsorption column (A2) will change place with the adsorption column (A1). This case is represented in FIG. 1 by the dash lines.

The method according to the present invention has been proved efficient using the solvents acetone, cyclohexane, acetic ester, ethanol, propanol and toluene.

The particle size of the adsorbing materials is not limited. Preferred are materials having a average particle size of from 0.1 to 10 mm. The average pore size as well as the pore size distribution is not limited. Preferred are materials having a pore size of from 0.4 to 50 nm. Adsorbents which are used preferably have a large proportion of miocropores (<2 nm) particularly a proportion of micropores of greater than 60%.

The bulk density of the adsorbents in the absorption bed is within the usual ranges. The velocity of the gas flow, fed through the adsorber, is also within the range of the usually used velocities. The adsorbent can furthermore be used in the form of structured packages. Therein the adsorbent is fixed on the surface of a body. This body can be, for example, honeycombed.

The content of substances to be adsorbed in the gas flows can be very high or very low. The method in accordance with the present invention can be used in particular for purification of gas flows. Thereby solvents, aroma agents and other minor components are removed. The method in accordance with the present invention can be, for example, used for the purification of the outlet air of planes, trains or cars.

The frequence of the used microwaves is not limited and is usually within 300 MHz and 300 GHz. The range of from 800 to 3,000 MHz is preferred. The Federal Communication Commission has freed the frequences of 915, 2450, 5800 and 22,125 MHz for the industrial, economical and medical use.

The following example illustrates the invention.

EXAMPLE 1

Figure 2:
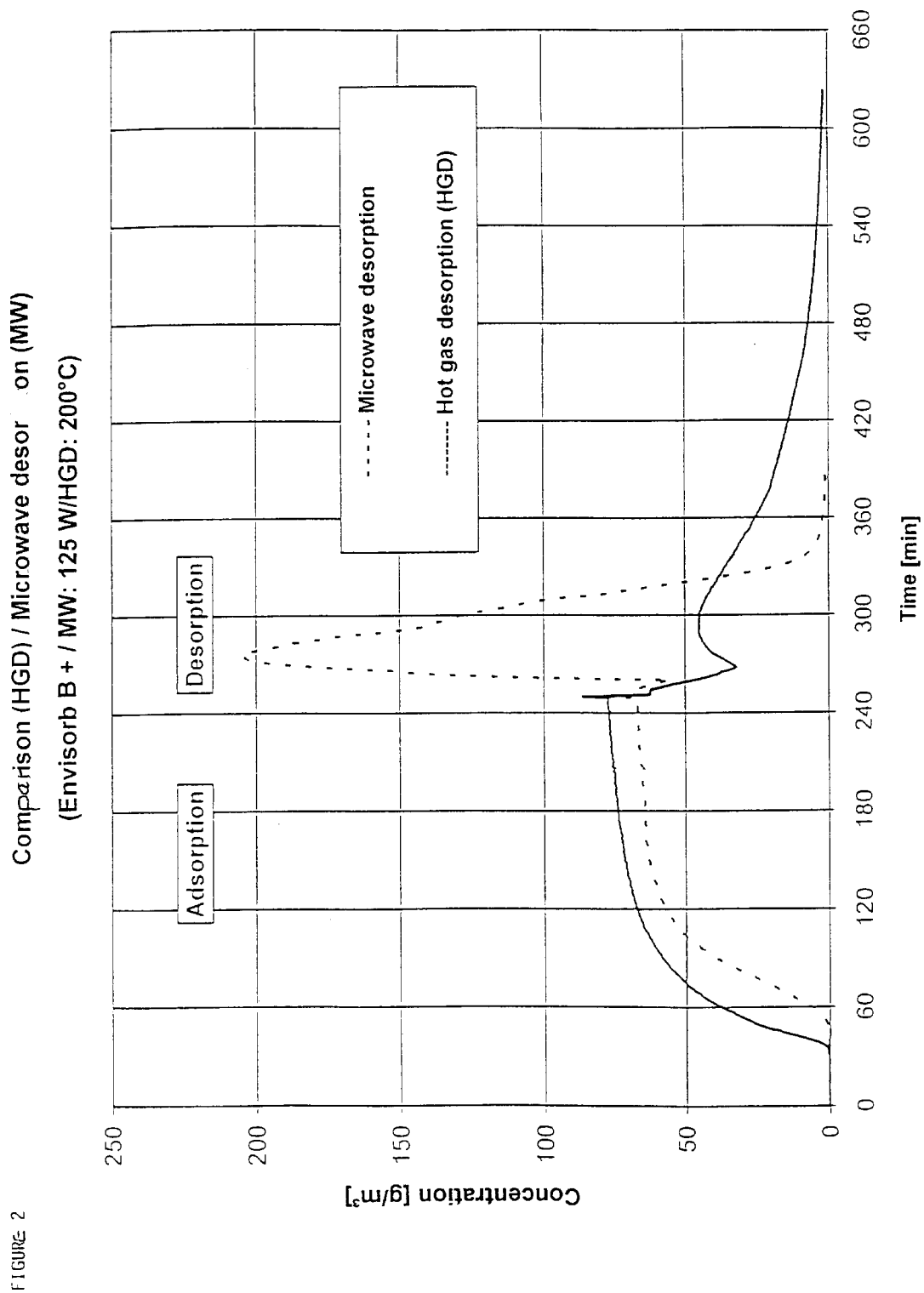

An absorbent comprising a body of a $SiO_2$ matrix having microdisperse divided inclusions of activated carbon is loaded with organic compounds. Subsequently a desorption is carried out. This desorption is carried out using hot gas desorption and microwave desorption. The obtained desorption curves are shown in FIG. 2. The microwave desorption was carried out using a performance of 125 W, the hot gas desorption was carried out at 200° C. FIG. 2 shows that the desorption using microwave can be completed within a short time. Compared thereto, the hot gas desorption needs longer time. This long desorption time results in higher costs, compared to the microwave desorption, simultaneously the resulting large amount of rinsing gas having only small loading leads to difficulties when condensing the desorbed compound.

What is claimed is:

1. Method for recovering and/or removing organic compounds from gas flows, comprising the steps of removing the organic substances from the gas flow using an adsorber and desorbing the organic compounds using microwaves, characterized in that the adsorber is a finely dispersed mixture of a hydrophilic and a hydrophobic adsorbents.

2. Method according to claim 1, characterized in that the desorbed organic compounds are condensed or fed to a catalytic or thermic after burning.

3. Method according to claim 1 or 2, characterized in that the desorbing of the organic compounds is carried out using a rinsing gas having room temperature.

4. Method according to claim 3, characterized in that the method is carried out continuously using a plurality of adsorbers or as fluidized bed process, moving bed process or using adsorption wheels.

5. Method according to claim 3 characterized in that the organic compounds are solvents, aroma components or other components from exhaust gases.

* * * * *